April 26, 1932.   B. G. GOBLE   1,855,347
POLISH ROD CLAMP
Filed June 10, 1929   2 Sheets-Sheet 1

Inventor
BERT G. GOBLE.
By
Tom B. Boman.   Attorney

April 26, 1932.   B. G. GOBLE   1,855,347
POLISH ROD CLAMP
Filed June 10, 1929   2 Sheets-Sheet 2
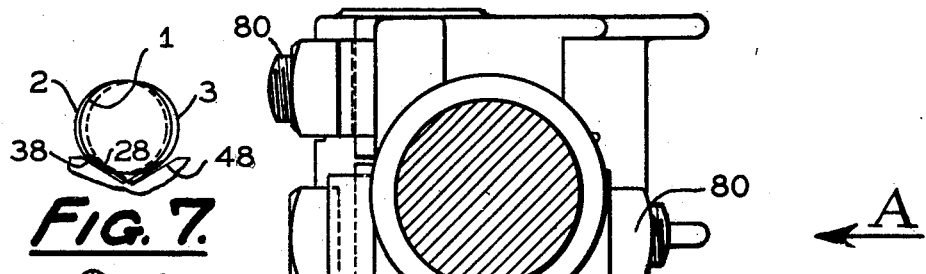
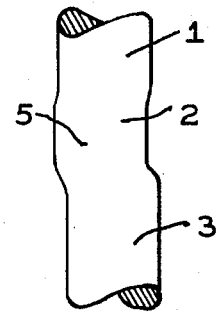
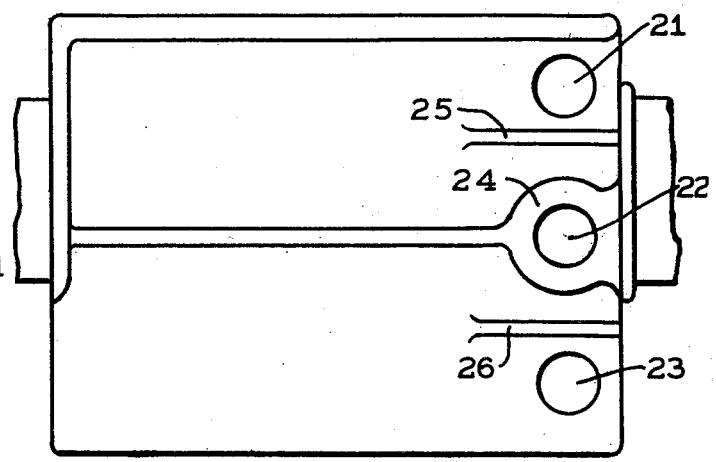
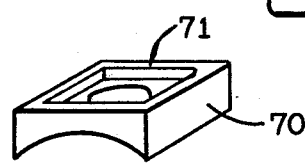
Inventor
BERT G. GOBLE.
By Tom G. Boman.   Attorney Patented Apr. 26, 1932

1,855,347

UNITED STATES PATENT OFFICE

BERT G. GOBLE, OF TULSA, OKLAHOMA, ASSIGNOR TO W. A. QUIGLEY

POLISH ROD CLAMP

Application filed June 10, 1929. Serial No. 369,769.

My invention relates to new and useful improvements in a rod or cable clamp and more particularly to a quickly attachable, yet powerful, polish rod clamp.

Polish rod clamps are widely used in the oil fields and, as the names implies, are fastened to the polish rod of a pumping outfit. The polish rod reciprocates through the usual stuffing box and power for this movement is furnished to the polish rod by means of a clamp attached thereto. This clamp must be fastened at different places along the rod, as the occasion demands, and it must also be so designed as to be capable of supporting the entire length of the pump rods and any entrapped fluid, without slipping.

I aim to invent a clamp which has several advantages over those manufactured at the present day. In the first place, I so construct my clamp as to use just half the usual number of bolts but yet obtain the same result. Consequently, my clamp may be tightened upon the rod in a minimum of time.

Another advantage of my clamp construction is the fact that I use a curved washer with a square recess therein whereby the head of the middle bolt may be seated. It will be noted that the head of this middle bolt is on the arm or pivot side of my clamp but is low enough to allow a wrench to clear the same when the adjacent nuts are being tightened. The curved face of the washer comes into contact with the curved face on the arm and thus prevents the washer and the head of the bolt nested therein from turning.

Also, I place my pulling bolts some little distance from the rod and obtain considerable leverage to clamp the rod in its seat in the clamp.

Furthermore, I utilize the fact that castings are always more or less irregular by purposely failing to machine the several seats in the several hinged elements whereby they are located at slightly different distances from the pivot point. Now when the elements are pulled downwardly towards the base member they separately seat upon the polish rod and tend to hold it in place not only by their clamping action but also by shearing action.

This shearing results from each element tending to positively seat the polish rod in a seat which is not exactly aligned with the other seats.

Another feature of my clamp is that it may be made with as many or as few arms as desired thus conforming itself for use with shallow or deep wells. It is always advisable, however, to use at least three arms and thus obtain a good safety factor.

My clamp is relatively simple in design there being no holes to thread. I use bolts throughout and in case of destruction thereof it is easy to slip the same out and replace by a new one. Also, when applying or detaching my clamp the hinged construction makes it unnecessary to hold two pieces and the hinged construction also automatically substantially aligns the several seats. This allows the free use of the other hand to insert the several bolts.

Yet another advantage is obtained by the use of my curved washers. The perforate washer, having a curved surface bearing against a correspondingly shaped surface on the coacting arm, aligns itself so that the nut may be tightened squarely against the flat side of the washer. Hence a firm contact is obtained.

Another feature is my interchangeable arms.

With the above and other objects in view, the invention has particular relation to certain novel features of construction, arrangement of parts and use, an example of which is given in this specification, and illustrated in the accompanying drawings, wherein:

Fig. 3 is a view taken along the line 3—3 of Fig. 2.

Fig. 4 is a back view of my clamp.

Fig. 5 is a perspective view of the washer used in connection with the nuts on the top and bottom bolts.

Fig. 6 is a perspective view of the washer used with the head of the central bolt.

Fig. 7 is a diagrammatic plan sketch through the polish rod showing the distortion thereof in exaggerated fashion.

Fig. 8 is a side view of the polish rod shown in Fig. 7.

Similar numerals refer to similar parts throughout the several views.

Figures 1, 2:
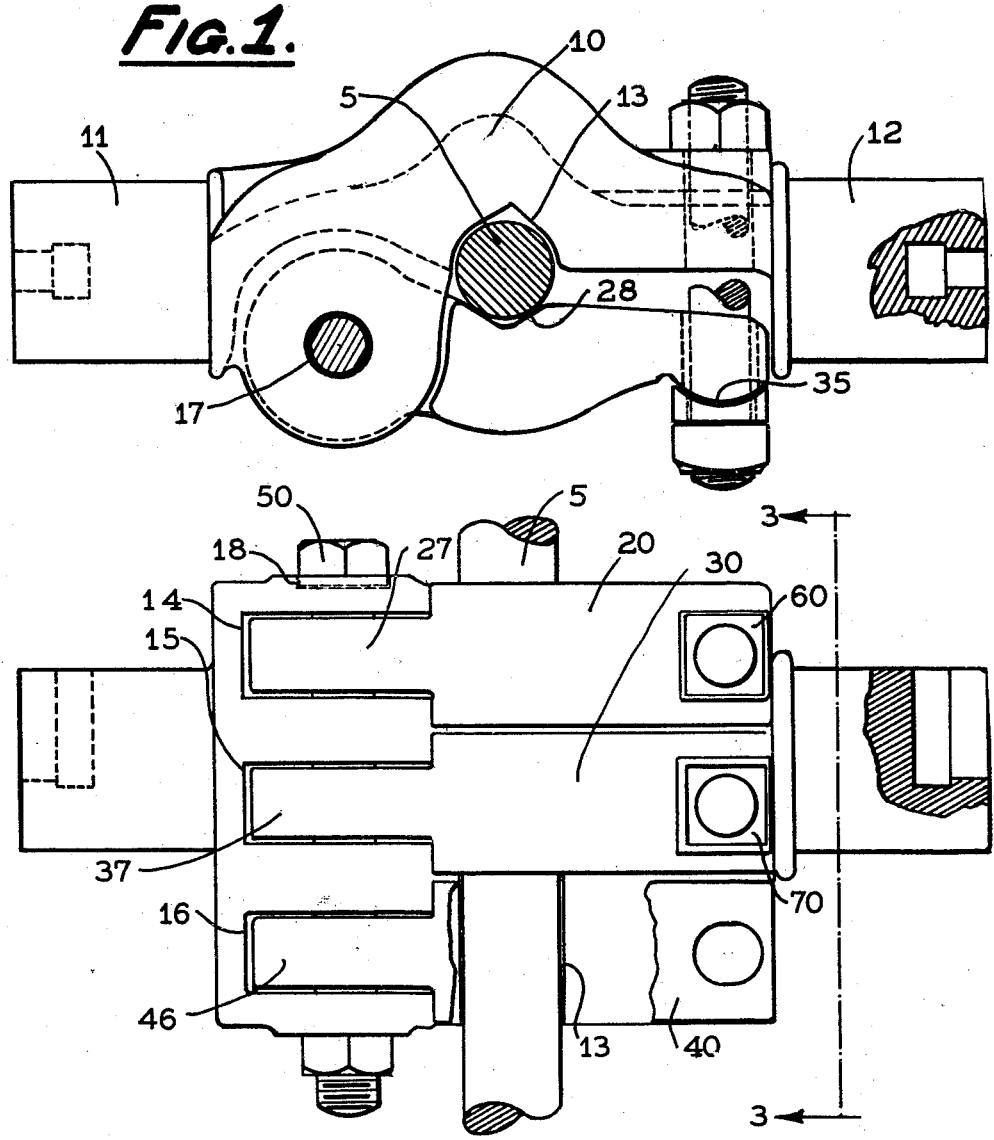
Fig. 1 is a top or plan view of my improved clamp, the heads of the upper two clamping bolts being broken away and the lower clamping bolt being entirely omitted in order to expedite the showing.
Fig. 2 is a side view of my clamp, the clamping bolts being omitted and the lower hinged element being partly broken away.

Referring in detail to the drawings it will be seen that my invention consists of a base or body member —10— having elements or arms —20—, —30— and —40— pivotally connected thereto by means of a single bolt, —50—. Bolts —80— pass through the several elements or arms and are kept in alignment by means of washers —60— and —70—.

Base or body member —10— is preferably cast or drop forged from a single piece and has trunnions or bearings —11— and —12— at each side. In the front face of the body member —10—, as shown in Fig. 1, a groove or seat —13— is formed. Recesses —14—, —15—, and —16—, are formed at one side of the seat or groove —13— and a hole —17— extends through the casting or forging about centrally of the recesses.

The elements or arms —20—, —30—, and —40— have reduced ends —27—, —37— and —46—, respectively.

Openings are also formed in these ends of the elements so that when they are introduced into the recesses in the body member the bolt —50— may be slid in place thus pivotally fastening them. Seats —28—, —38—, and —48— are respectively formed in these three elements and face or are juxtaposed to the groove or seat —13— thus forming a bore. It will be noted, however, that these seats will vary a little from alignment as they are not machined for a perfect fit and I utilize this feature in that I do not machine them. In other words I have discovered that a triple clamp of my design will not only hold three times the load of a single clamp but will hold a great deal more. This is due to the shearing or bending of the polish rod.

Referring to Figs. 7 and 8, the polish rod —5— is shown in a very distorted position. This exaggeration is for the purpose of clearly setting forth the manner in which my improved rod clamp operates. The numeral —1— designates the rod near its seat —28—, the numeral —2— opposite its seat —38— and the numeral —3— opposite its seat —48—.

When the bolt —80— is passed through the hole —21— and the washer —60— and its nut tightened it will draw its V-shaped seat —28— down upon the polish rod and slightly distort it as shown at —1— in Fig. 8. The washer —60— has a curved face —61— which permits the nut of the bolt —80— to align itself at exactly right angles to the stem of the bolt and as the nut is tightened the washer may slidably readjust itself if necessary.

Curved or convex surfaces —35—, are provided on the arms and serve as seats for the upper and lower curved washers, —60— as well as the intermediate washer —70—.

The middle or intermediate washer —70— has a rib —71— around its edge as clearly shown in Fig. 6 which prevents the head of the bolt —80— from turning. It will be noted that the center bolt has its head oppositely faced to the other two bolts.

From the above description it will be appreciated that I have invented a clamp which has long been needed in the oil fields and which will function in an efficient manner and I desire to protect the same by the following claims.

1. A hinged clamp composed of a base member, three or more elements hinged thereto, each element having an open slot or seat therein adapted to cooperate with a groove or seat formed in the base member to form a bore and separate means for pulling each element towards the base member, said elements being spaced from each other.

2. A polish rod clamp consisting of a body member, trunnions on opposite sides of said body member, said body member having several recesses therein and a seat or groove adjacent the recesses, said body also having a hole therethrough in parallelism with the seat or groove and in alignment with the recesses; arms, each having a hole in one end, a seat or groove along its length and another hole in its other end, partly inserted in said recesses, a pivot bolt passing through the aligned holes to hold the arms and the body in hinged relationship whereby the several seats in the arms coact with the seat in the body member; said body member also having holes in alignment with each of the holes on the movable ends of the arms; said arms having curved cylindrical surfaces about the last mentioned holes, said surfaces being in parallelism with the axis of the pivot bolt, bolts placed in the last mentioned holes and through the aligned holes in the body, washers having cylindrical surfaces on one side placed over the bolts and abutting the curved surfaces on the arms and means for forcing the washers in tight aligning contact with the arms.

3. A clamp consisting of a base, elements hinged thereto, said base and elements having seats therein, the seats in the elements being a slightly different distance from the pivot point than the seat in the base whereby an irregularly shaped bore is obtained.

In testimony whereof I affix my signature.

BERT G. GOBLE.